United States Patent
Aaltonen et al.

(10) Patent No.: US 9,826,491 B2
(45) Date of Patent: Nov. 21, 2017

(54) METHOD AND APPARATUS FOR SYNCHRONIZATION OF DEVICES

(71) Applicant: Nokia Technologies Oy, Espoo (FI)

(72) Inventors: Timo Tapani Aaltonen, Tampere (FI); Juha Pekka Luoma, Tampere (FI); Tapani Antero Leppanen, Tampere (FI); Eero Tapani Aho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 198 days.

(21) Appl. No.: 13/749,013

(22) Filed: Jan. 24, 2013

(65) Prior Publication Data

US 2013/0198292 A1 Aug. 1, 2013

Related U.S. Application Data

(63) Continuation-in-part of application No. 13/363,034, filed on Jan. 31, 2012, now Pat. No. 9,386,434.

(51) Int. Cl.
*H04W 56/00* (2009.01)

(52) U.S. Cl.
CPC .................................. *H04W 56/00* (2013.01)

(58) Field of Classification Search
CPC ....... H04W 4/00; H04W 4/004; H04W 56/00; H04L 1/0018
USPC ......................................................... 709/204
See application file for complete search history.

(56) References Cited

U.S. PATENT DOCUMENTS

| 7,545,320 | B2 * | 6/2009 | Oster ....................... G01S 19/05 342/357.42 |
| 8,762,467 | B2 * | 6/2014 | Virani ................... H04L 12/582 709/205 |
| 2001/0056501 | A1 * | 12/2001 | Law et al. .................... 709/248 |
| 2003/0130040 | A1 * | 7/2003 | Dripps ...................... A63F 13/12 463/42 |

(Continued)

OTHER PUBLICATIONS

Kirovski, D. et al., "*The Martini Synch: Using Accelerometers for Device Pairing*," Microsoft Research, Jun. 2009, pp. 1-16.

(Continued)

*Primary Examiner* — Dustin Nguyen
*Assistant Examiner* — Javier O Guzman
(74) *Attorney, Agent, or Firm* — Alston & Bird LLP

(57) ABSTRACT

A method, apparatus, and computer program product are provided to enable the provision of a mechanism by which a device participating in a collaborative application may synchronize with other participating devices. A method may include providing for operation of a collaboration application, providing for transmission of a multicast reference time request to a wireless access point, receiving a multicast reference time message, establishing a reference time in response to receiving the reference time message, and synchronizing the collaboration application using the reference time. The synchronization of the collaboration application may be performed in response to receiving an acknowledgement message from collaborating devices. The method may further include providing for transmission of a second multicast reference time request in response to not receiving an acknowledgement message from the collaborating devices. The multicast reference time message may be received from the wireless access point.

20 Claims, 10 Drawing Sheets

(56) References Cited

U.S. PATENT DOCUMENTS

| | | | | |
|---|---|---|---|---|
| 2006/0161621 | A1* | 7/2006 | Rosenberg | H04L 67/1095 709/204 |
| 2007/0249291 | A1* | 10/2007 | Nanda | H04W 36/0083 455/73 |
| 2008/0148360 | A1* | 6/2008 | Karstens | 726/4 |
| 2009/0182813 | A1* | 7/2009 | McCartie | H04N 7/163 709/205 |
| 2009/0222142 | A1* | 9/2009 | Kao | G05B 15/02 700/291 |
| 2010/0161723 | A1 | 6/2010 | Bryce et al. | |
| 2011/0187652 | A1 | 8/2011 | Huibers | |
| 2011/0191823 | A1 | 8/2011 | Huibers | |
| 2012/0195313 | A1* | 8/2012 | White | H04L 43/0858 370/390 |
| 2012/0263165 | A1* | 10/2012 | Zakrzewski et al. | 370/350 |

OTHER PUBLICATIONS

Mayrhofer, R. et al., "*Shake Well Before Use: Intuitive and Secure Pairing of Mobile Devices*," IEEE Transactions on Mobile Computing, vol. 8, No. 6, Jun. 2009, pp. 792-806.

Mills, D. et al., "*Network Time Protocol Version 4: Protocol and Algorithms Specification*," RFC 5905, Internet Engineering Task Force (IETF), ISSN: 2070-1721, Jun. 2010, pp. 1-92.

Office Action for U.S. Appl. No. 13/363,034, dated Nov. 19, 2014.

Office Action for U.S. Appl. No. 13/363,034, dated May 6, 2015.

Office Action for U.S. Appl. No. 13/363,034, dated Aug. 20, 2015.

Office Action for U.S. Appl. No. 13/363,034 dated Jun. 26, 2014.

Gayraud, R. et al., *Network Time Protocol (NTP) Server Option for DHCPv6*, IETF, RFC 5908 (Jun. 2010) 9 pages.

Gerstung, H. et al., *Definitions of Managed Objects for Network Time Protocol Version 4 (NTPv4)*, IETF, FRC 5907 (Jun. 2010) 25 pages.

Haberman, B. et al., *Network Time Protocol Version 4: Autokey Specification*, IETF, RFC 5906 (Jun. 2010) 55 pages.

Mills, D. et al., *Network Time Protocol Version 4: Protocol and Algorithms Specification*, IETF, RFC 5905 (Jun. 2010) 103 pages.

IEEE1588 Frequently Asked Questions (FAQs), Intel (Dec. 2011) 7 pages.

Using Hardware Timestamps with PF_RING, [online] [retrieved Jul. 29, 2014]. <URL: http://www.ntop/org/pf_ring/hardware-time-stamps-with-pf_ring>. (dated Feb. 11, 2011) 2 pages.

SyncEvolution—The Missing Link, Linux 2.6.30: Hardware Assisted Time Stamping of Network Packets, [online] [retrieved Jul. 29, 2014]. <URL: http://www.estamos.de/blog/2009/07/01/1inux-2-6-30-hardware-assisted-time-stamping-of-network-packets/comments-page -1>. (dated Jul. 1, 2009) 10 pages.

Precision Time Protocol (PTP), IEEE 1588, [online] [retrieved Jul. 30, 2014]. <URL: http://en.wikipedia.org/w/index.php?title=Precision_Time_Protocol&oldid=472312248>. (dated Jan. 20, 2012). 7 pages.

\* cited by examiner

METHOD AND APPARATUS FOR SYNCHRONIZATION OF DEVICES

CROSS-REFERENCE TO RELATED APPLICATIONS

This application is a continuation-in-part of U.S. patent application Ser. No. 13/363,034 entitled "Method and Apparatus for Synchronization of Devices" filed on Jan. 31, 2012, the disclosure of which is herein incorporated by reference.

TECHNOLOGICAL FIELD

Some example embodiments of the present invention relate generally to collaboration applications and, more particularly, relate to a method and apparatus for providing a mechanism by which devices may be synchronized with one another for operation of collaboration applications.

BACKGROUND

Advancements in mobile device technology have developed mobile devices, such as cellular telephones and portable digital assistants (PDAs) that have increased capabilities and provide a user with greater access and control of information. Users may have numerous applications which may communicate and collaborate with other user devices to enhance the user experience and to provide greater functionality than that of a device operating independently.

Collaborative applications may provide a benefit to users through expanded functionality and enhanced capabilities using multiple devices to accomplish tasks and functions; however, these applications typically require time synchronization with a time server in order to facilitate efficient and proper collaboration. Network latency and communication issues may preclude collaborative applications from properly synchronizing devices leading to a lower quality collaborative experience or loss of functionality of the collaboration.

BRIEF SUMMARY

A method, apparatus and computer program product are provided to enable the provision of a mechanism by which a device participating in a collaborative application may synchronize with other participating devices. In some cases, for example, a device may initiate a collaborative application, provide for transmission of a multicast reference time request, receive the multicast reference time, and synchronize the collaboration application.

An example embodiment may provide a method for providing for operation of a collaboration application, providing for transmission of a multicast reference time request to a wireless access point, receiving a multicast reference time message, establishing a reference time in response to receiving the reference time message, and synchronizing the collaboration application using the reference time. The synchronization of the collaboration application may be performed in response to receiving an acknowledgement message from collaborating devices. The method may further include providing for transmission of a second multicast reference time request in response to not receiving an acknowledgement message from the collaborating devices. The multicast reference time message may be received from the wireless access point. Synchronization of the collaboration application may not require network latency compensation. All collaborating devices of the collaboration application may be within range of the wireless access point. Each collaborating device may calculate a delay specific to itself to improve accuracy of the synchronization.

Another example embodiment may provide an apparatus including at least one processor and at least one memory including computer program code, the at least one memory and the computer program code configured to, with the processor, cause the apparatus to at least provide for operation of a collaboration application, provide for transmission of a multicast reference time request to a wireless network access point, receive a multicast reference time message, establish a reference time in response to receiving the reference time message, and synchronize the collaboration application using the reference time. The synchronization of the collaboration application may be performed in response to receiving an acknowledgement message from collaborating devices. The apparatus may be further caused to provide for transmission of a second multicast reference time request in response to not receiving an acknowledgement message from the collaborating devices. The multicast reference time message may be received from the wireless access point. Synchronization of the collaboration application may not require network latency compensation. All collaborating devices of the collaboration application may be within range of the wireless access point. Each collaborating device may calculate a delay specific to itself to improve accuracy of the synchronization.

Another example embodiment may provide a computer program product comprising at least one non-transitory computer-readable storage medium having computer-executable program code instructions stored therein, the computer-executable program code instructions comprising program code instructions to provide for operation of a collaboration application, program code instructions to provide for transmission of a multicast reference time request to a wireless access point, program code instructions to receive a multicast reference time message, program code instructions to establish a reference time in response to receiving the reference time message, and program code instructions to synchronize the collaboration application using the reference time. The program code instructions to synchronize the collaboration application may be executed in response to receiving an acknowledgement message from collaborating devices. The computer program product may further include program code instructions to provide for transmission of a second multicast reference time request in response to not receiving an acknowledgement message from the collaborating devices. The multicast reference time message may be received from the wireless access point. The program code instructions to synchronize the collaboration application may not require network latency compensation. All collaborating devices of the collaboration application may be within range of the wireless access point.

Another example embodiment may provide an apparatus including means for providing for operation of a collaboration application, means for providing for transmission of a multicast reference time request to a wireless access point, means for receiving a multicast reference time message, means for establishing a reference time in response to receiving the reference time message, and means for synchronizing the collaboration application using the reference time. The synchronization of the collaboration application may be performed in response to receiving an acknowledgement message from collaborating devices. The apparatus may further include means for providing for transmission of a second multicast reference time request in response to not receiving an acknowledgement message from the collaborating devices. The multicast reference time message may be received from the wireless access point. Synchronization of the collaboration application may not require network latency compensation. All collaborating devices of the collaboration application may be within range of the wireless access point. Each collaborating device may calculate a delay specific to itself to improve accuracy of the synchronization.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION

Figure 1:
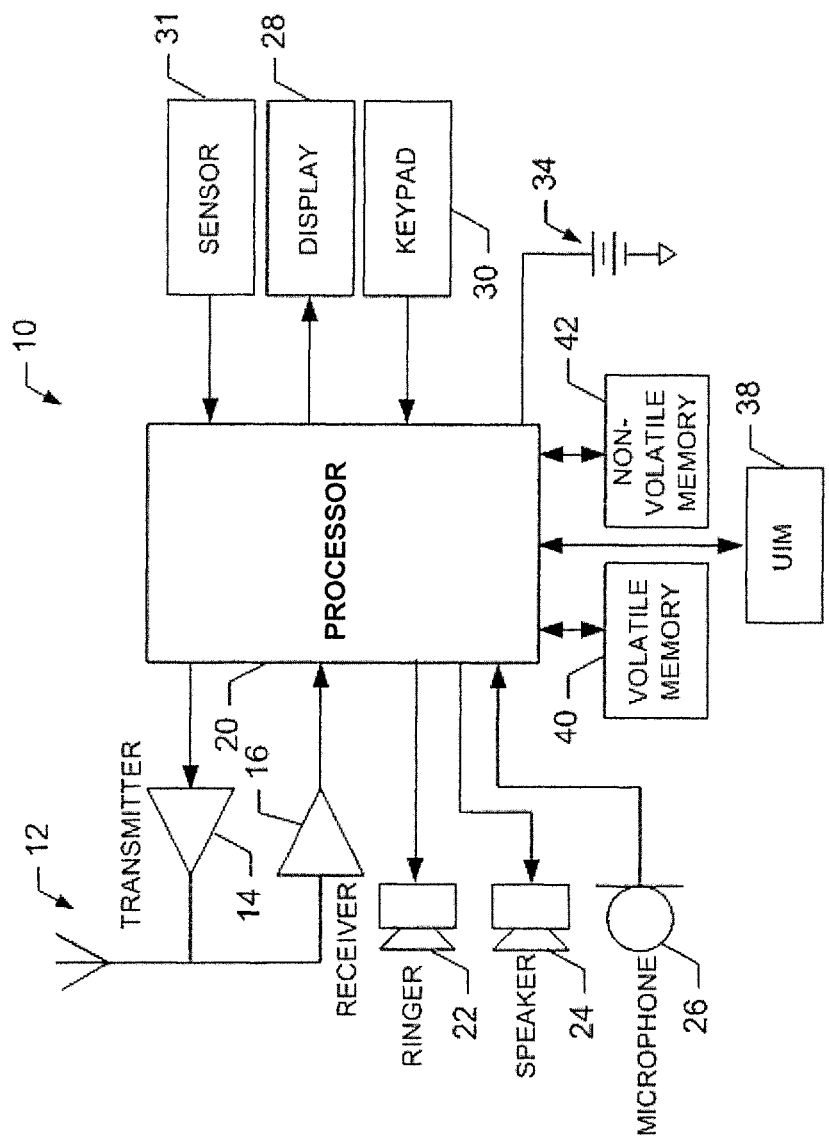
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may relate to a provision of a mechanism by which a device participating in a collaborative application may synchronize with other participating devices. Collaborative applications may require that participating devices be synchronized to properly collaborate within the application. Multi-device collaboration applications may share data, distribute computational requirements, receive or transmit information simultaneously, or otherwise function together, collaboratively, to expand the functionality of multiple devices beyond that of a single device. Therefore, it may be desirable to synchronize the participating devices for the collaboration application.

FIG. 1 illustrates a block diagram of a mobile terminal 10 that would benefit from an embodiment of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, while other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) such as IEEE 802.11a/b/g/n; wireless personal area network (WPAN) such as Bluetooth, IEEE 802.15.3 (High Rate WPAN) or IEEE 802.15.4 (Low Rate WPAN); white space network such as IEEE 802.11af (White-Fi) or IEEE 802.22 (Wireless Regional Area Network (WRAN)); wireless wide area network (WWAN) such as WiMAX; digital broadcasting network such as Digital Video Broadcasting (DVB), Digital Audio Broadcasting (DAB) or Digital Radio Mondiale (DRM); or other communication networks.

While embodiments of the invention are described primarily in the context of a wireless local area network, embodiments of the invention may be implemented with other types of radio systems, like TV white spaces.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely.

Additional input to the processor 20 may be provided by a sensor 31. The sensor 31 may include one or more of an accelerometer, a motion sensor, temperature sensor, light sensor, or the like. Forms of input that may be received by the sensor may include physical motion of the mobile terminal 10, whether or not the mobile terminal 10 is in a dark environment (e.g., a pocket) or in daylight, whether the mobile terminal is being held by a user or not (e.g., through temperature sensing of a hand) or the physical orientation of the mobile terminal 10 as will be further described below. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a mechanism by which a device may be synchronized with other devices for a collaboration application. The apparatus 50 of FIG. 2 may be employed, for example, in conjunction with the mobile terminal 10 of FIG. 1. The user interface 72 of FIG. 2 may include one or more of the display 28 and keypad 30 of the mobile terminal of FIG. 1. The apparatus may further include one or more sensors 84 such as sensor 31 of FIG. 1. The processor 70 of FIG. 2 may be embodied in the processor 20 of FIG. 1 and the communications interface 72 may include the transmitter 14, receiver 16, and antenna 12 of the mobile terminal 10. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1.

Figure 2:
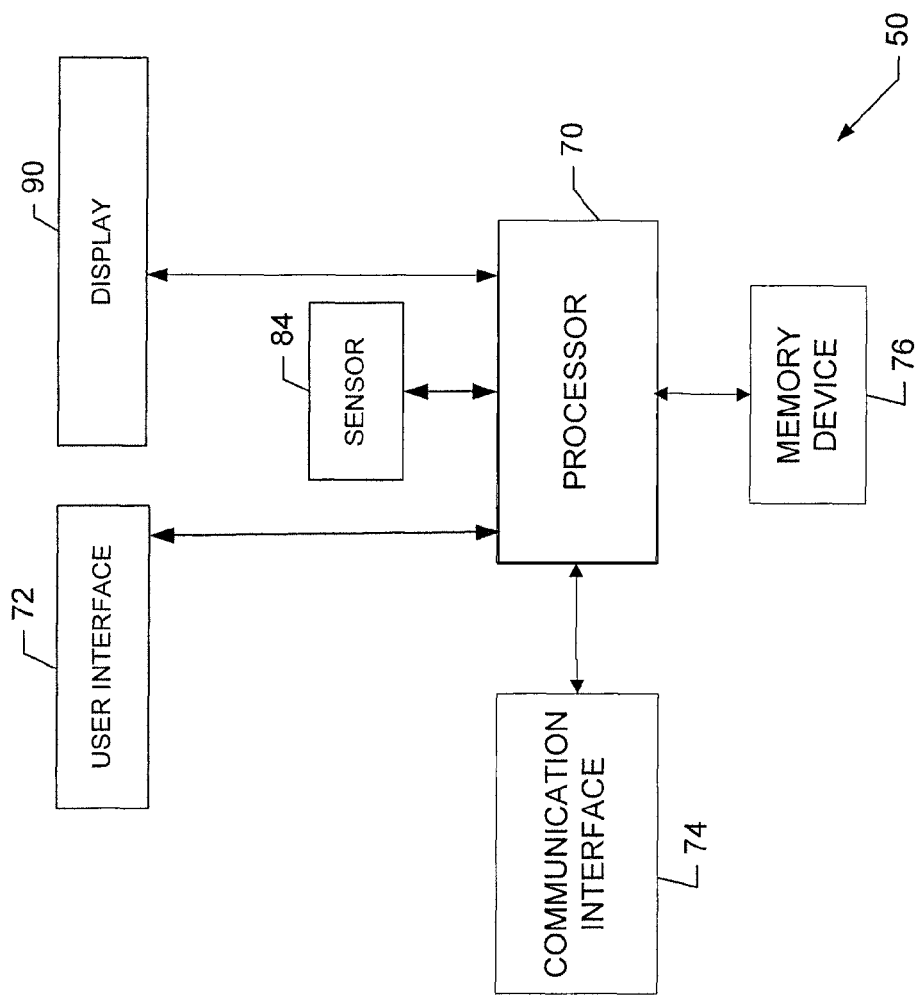
FIG. 2 is a schematic block diagram of an apparatus for providing a mechanism by which devices may be synchronized with one another for operation of collaboration applications according to an example embodiment of the present invention.

It should also be noted that while FIG. 2 illustrates one example of a configuration of an apparatus for providing a mechanism by which a device may be synchronized with other devices for a collaboration application, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring again to FIG. 2, the apparatus 50 for providing a mechanism by which a device may be synchronized with other devices for a collaboration application is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display 90. In different example cases, the display 90 may be a two dimensional (2D) or three dimensional (3D) display. Additionally or alternatively, the display 90 may include multiple display surfaces. The user interface 72 may be in communication with the display 90 to receive indications of user inputs and to modify a response to such inputs based on corresponding user actions that may be inferred or otherwise determined responsive to the indications.

Example embodiments of devices according to the present invention may be capable of collaborating with other devices in collaboration applications which may benefit from multiple devices functioning together such as through the sharing of data, distribution of computational requirements, distribution of communication requirements, optimizing application function, or otherwise collaborating in a symbiotic or parasitic relationship with one another to perform the functions of the collaboration application.

Collaboration applications may include a wide variety of applications, such as computationally intensive applications which benefit from distributing their computational requirements among multiple devices to enhance processing capacity. Other applications may include game applications in which each participating device may serve as a player in the game. Further collaboration applications may include applications which gather data, such as a multi-media recording application which may allow participating devices to capture multi-channel sound and/or multi-position video for a stereophonic or stereoscopic multimedia experience. Many other embodiments of collaboration applications may similarly benefit from example embodiments of the present invention.

In order for devices to participate in a collaboration application, the devices may be in communication with one another (e.g., via communication interface 74) via near-field communication mechanisms (e.g., Bluetooth™) or other communication protocols as described above. The communication between participating devices may be direct, as in Bluetooth™ communication, or the communication may be through a network, such as a cellular network.

Collaboration applications may require or benefit from the clock synchronization of participating devices. When several devices are joined for the same task (e.g., capturing and processing sensor data, or producing audio/visual/haptic signals), they typically need to be synchronized to provide optimum functionality. Producing signals collaboratively may also require synchronization of the devices participating in the collaboration. Synchronization of devices may improve the efficiency and accuracy of data and information exchanged between synchronized devices. Synchronization of devices may include synchronizing a clock within each device with a clock of the other participating devices, such as a system clock (e.g., within processor 70) or mechanism by which a device keeps time for time-stamping data and information. Optionally, synchronization may be performed only for the collaboration application such that the collaboration application maintains a clock feature for the participating devices for the duration of the collaboration between the participating devices.

Conventional synchronization of a device may rely upon communication between the device and a network entity, such as a time server operating on a remote network, which requires a connection to the network entity (e.g., via communications interface 74) and requires traversal time of messages to and from the network entity to establish a time or synchronization. Such a synchronization process may need to compensate for varying network latency and the speed and accuracy of synchronization may depend upon network characteristics and connectivity of the participating devices.

Example embodiments of the present invention may provide a mechanism for establishing synchronization of devices participating in a collaboration application in a manner that does not require communication with a remote network server or compensation for network latency problems. Further, example embodiments may provide a mechanism for establishing synchronization of participating devices without requiring a synchronization signal or clock signal to be sent or exchanged between devices participating in a collaboration application.

In an example embodiment of the present invention, a user may initiate a collaborative application on a first device, such as mobile device 10, and join other devices to the collaboration. The other device or devices to participate in the collaboration application may send or receive a request to join the collaboration. The request may be sent or received through near-field or far-field communications protocols, or transmitted through a wireless network, such as a WLAN. A user may initiate the collaborative application also on the other device so that both devices are ready for the collaboration. Upon initiation of the collaboration application, the collaboration application may require or benefit from synchronization of participating devices. Embodiments of the present invention may provide various methods for synchronization of devices for participation in the collaboration application.

Multicast Synchronization

As outlined above, multi-device, collaborative applications may require or benefit from clock synchronization or establishing a common reference time. While some applications allow for off-line synchronization based on analysis of captured data, this mechanism can be very complex and error-prone. In many cases, synchronization accuracy need not be exact, but rather high enough such that the effects of limited accuracy are not perceivable by a user of the application. Hardware and software delays may be different in different types of devices such that synchronization accuracy may not be the limiting factor in terms of operation of the collaboration application.

An example embodiment of the present invention may define a reference time to several devices simultaneously by using Internet Protocol (IP) multicast to send a point-to-multipoint message that may be time-stamped on each receiving device upon reception of the IP packet at the hardware level. This method may provide a relatively simple and accurate method to define a common reference time to a subset, or all devices connected to the same wireless access point. Using this reference time, the devices can be instructed to operate simultaneously without the need to synchronize clocks in each participating device. Hardware time-stamps from Network Interface Cards (NICs) is a known technology typically used to, for example, monitor network traffic and for obtaining accurate Precision Time Protocol (PTP) time-stamps. Some operating systems may provide an interface for applications to easily access NIC hardware time-stamps. Hardware time-stamp support has also been included in many recent off-the-shelf NIC products.

In an example embodiment, a device that is participating in the collaboration application may initialize a reference time definition by sending a reference time message, such as via an IPv4 (Internet Protocol version 4) or IPv6 (Internet Protocol version 6) multicast packet containing a UDP (User Datagram Protocol) payload. The multicast message is sent to a destination multicast group which includes the sender. The multicast message may be recognized by each of the devices of the destination multicast group. For example, the reference time message may be recognized as such because it is sent to a destination multicast address and port that are well-known to implementations of this synchronization technique. Alternatively, not requiring a well-known address and port, the reference time message could be identified by a new header field specified as an extension to a protocol such as RTP (Real-time Transport Protocol).

The message received by the devices of the destination multicast group may include timestamp information from hardware time-stamping enabled in the NIC (Network Interface Controller). Alternatively, the receiving NIC may not support hardware time-stamping. The information in the message may include: a) hardware or low-level software timestamp of the system clock when the message was received; and b) source IP address and UDP port of the message. Using the information from the message, the collaboration application or upper protocol layers on each device may be able to determine the established reference time. The same reference time may be maintained for all packets received from the same origin, defined by the source IP address (and optionally the source UDP port) in the reference time message. As such, more than one reference time may be tracked by a receiver of reference time messages, allowing devices to operate on more than one collaboration application.

Figure 3:
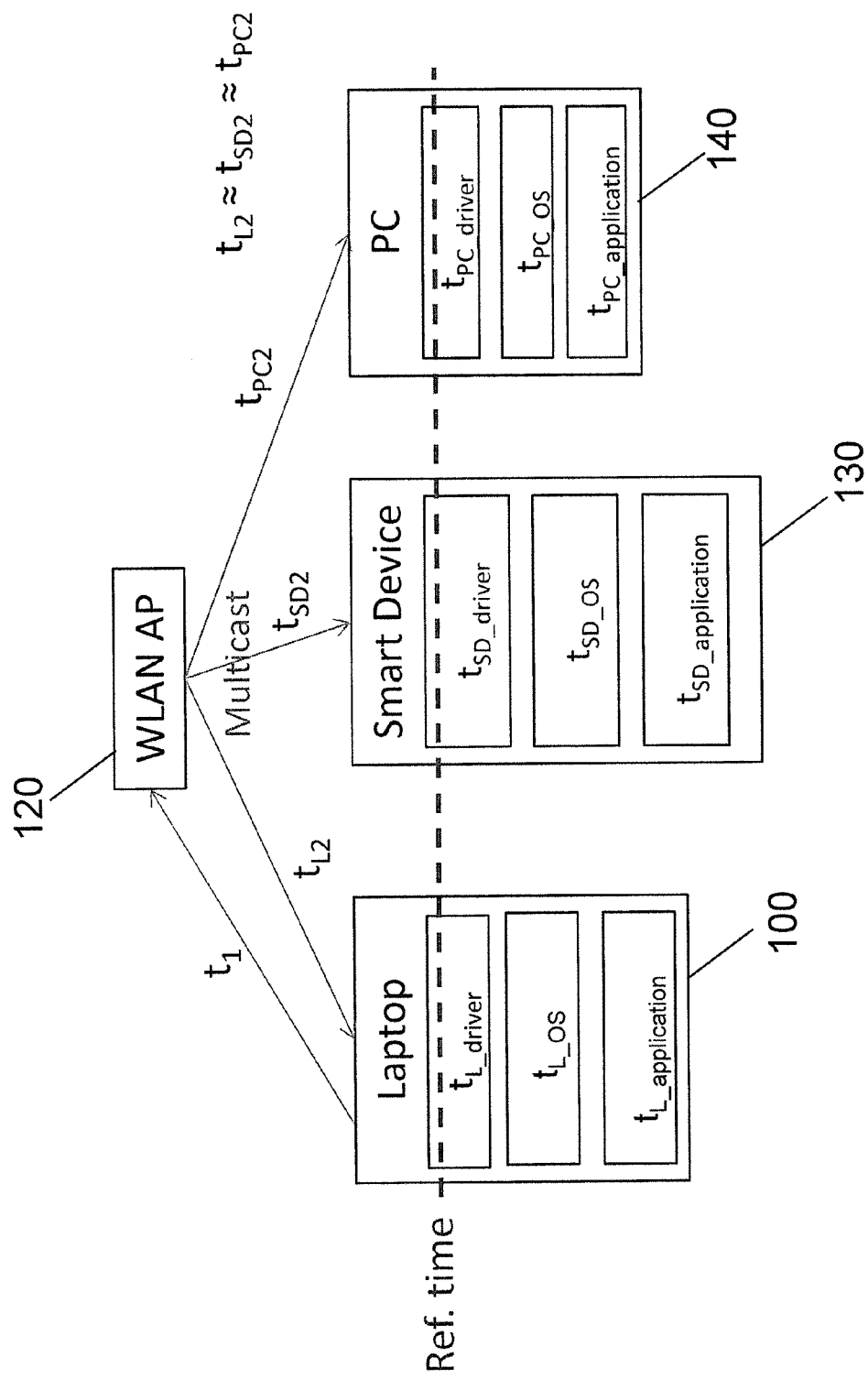
FIG. 3 is a schematic representation of a group of devices establishing a reference time for a collaboration application according to an example embodiment of the present invention.

FIG. 3 illustrates a method to define a reference time according to the above described example. As shown, the reference time definition is initialized by a laptop 100 by a reference time request message (with delay $t_1$) sent to the wireless access point 120. The wireless access point 120 then sends a multicast message to all of the devices of the collaboration application including the Laptop 100 via message with delay $t_{L2}$, the Smart Device 130 (e.g., a mobile phone) via message with delay $t_{SD2}$, and the Personal Computer (PC) 140 via message with delay $t_{PC2}$. Each of the devices (the Laptop 100, the Smart Device 130, and the PC 140) may be in relatively close proximity since they are connected to the same wireless access point (e.g, within a few hundred meters). Moreover, the radio signal speed with which the devices communicate with the wireless access point is very high relative to the proximity of the devices to the wireless access point such that delays between the wireless access point sending the multicast signals and the devices receiving the signals are relatively similar ($t_{L2} \approx t_{SD2} \approx t_{PC2}$). In each of the devices, the time stamp may be taken from the wireless access point driver hardware or low level driver software. Thus, a reference time for each of the devices is established.

While each of the devices of FIG. 3 may have their own hardware and/or software delays, such as driver delays ($t_{L\_driver}$, $t_{SD\_driver}$, $t_{PC\_driver}$), operating system delays, $t_{L\_OS}$, $t_{SD\_OS}$, $t_{PC\_OS}$), and application delays ($t_{L\_application}$, $t_{OS\_application}$, $t_{PC\_application}$), each of the devices may be aware of their specific delays in order to compensate and establish their reference time relative to the other devices.

In response to a device of the destination multicast group receiving a reference time message from the wireless access point, the device may send a confirmation message to the original requesting device (e.g., the Laptop 100) to confirm establishment of the reference time. The confirmation message may be sent by the collaboration application, or the message may be sent by the communication protocol stack of the device. The confirmation message may be sent as the payload of a unicast UDP packet to the source IP address and port of a reference time message received as the payload of a multicast UDP packet; alternatively, the confirmation message may be included as an extension specified for the RTCP (Real-time Transport Control Protocol) message, sent to the source IP address and port of an RTP message that includes an extension specified to contain a reference time message.

Figure 4:
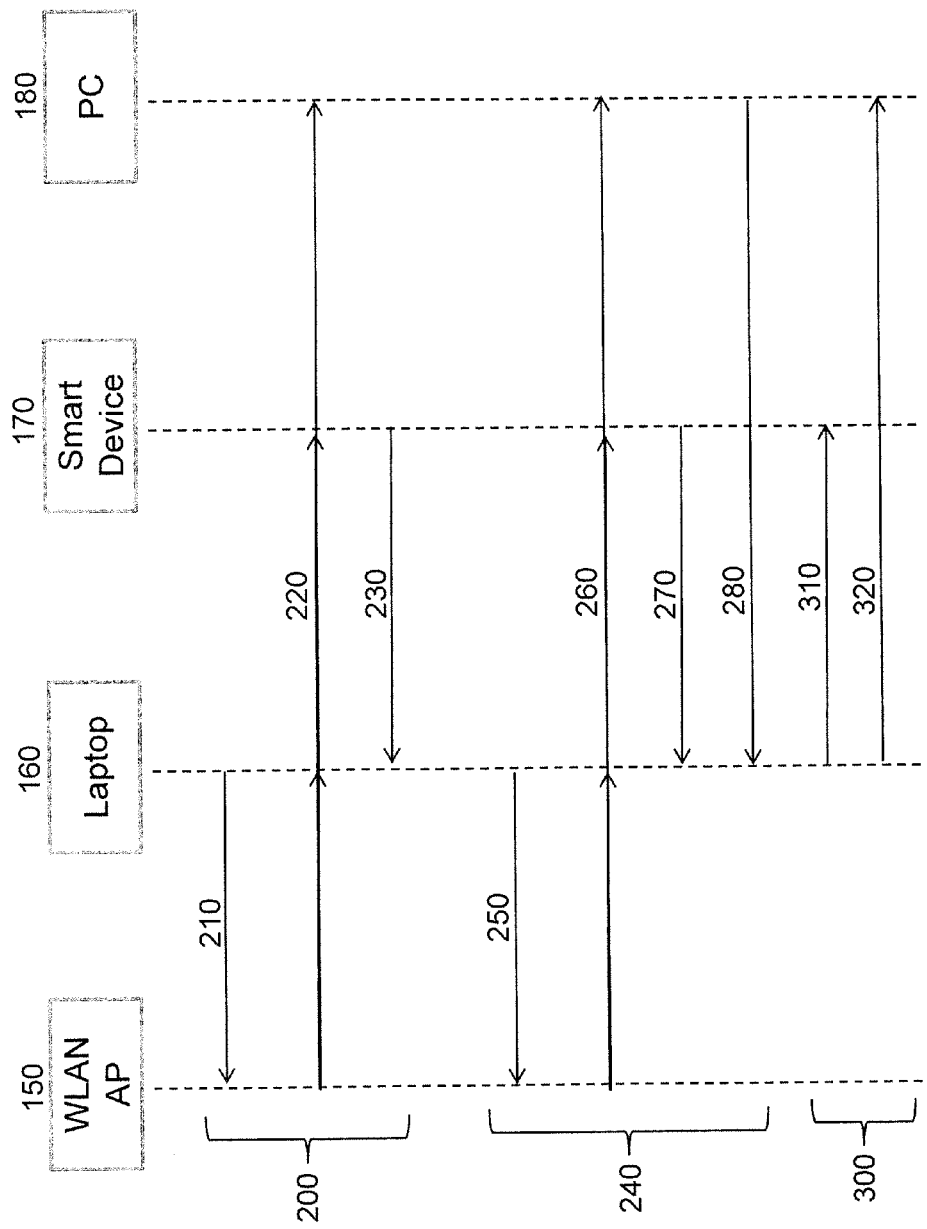
FIG. 4 is a schematic representation of the messages exchanged by a group of devices establishing a reference time for a collaboration application according to an example embodiment of the present invention.

FIG. 4 illustrates an example implementation of the above described method for synchronization using the devices of FIG. 3. In the illustrated embodiment, Laptop 160 initiates a collaborative application and controls the behavior of the system. In the operations of 200, the Laptop 160 sends a multicast reference time request to wireless access point 150 at 210. The wireless AP 150 sends the multicast reference time message 220 to each of the devices of the collaboration application, including the requesting device, Laptop 160. The Smart Device 170 sends a confirmation message 230 to the Laptop 160 confirming receipt of the multicast reference time message. The PC does not respond with such a message in the operations of 200. In response to not receiving a confirmation message from each of the devices of the collaboration application, the Laptop 160 sends another multicast reference time request 250 to the wireless AP 150 in the operations of 240. The wireless AP 150 sends the multicast reference time message 260 to the Laptop 160, the Smart Device 170, and the PC 180. In response to receiving the request, the Smart Device 170 confirms receipt to the Laptop 160 at 270 and the PC 180 confirms receipt at 280. The collaboration application may then be commenced by the Laptop 160 with messages 310 and 320 representing tasks or other messages related to the application.

Bump Synchronization

While the above referenced example includes a multicast reference time message to synchronize the devices of the collaboration application, other methods for synchronization may not require communication between devices or network access points. In the following example, the participating devices may be "bumped" together to establish synchronization. The "bump" may be a physical contact between the devices resulting in an acceleration change (seen at sensor 84, for example) that is greater than the acceleration typically experienced by the device. The bumping of the devices may be requested, required, or suggested by the collaboration application (e.g., via user interface 72). Optionally, experienced users may understand that synchronization is desirable for certain collaboration applications and may perform the synchronization without a request.

Figure 5:
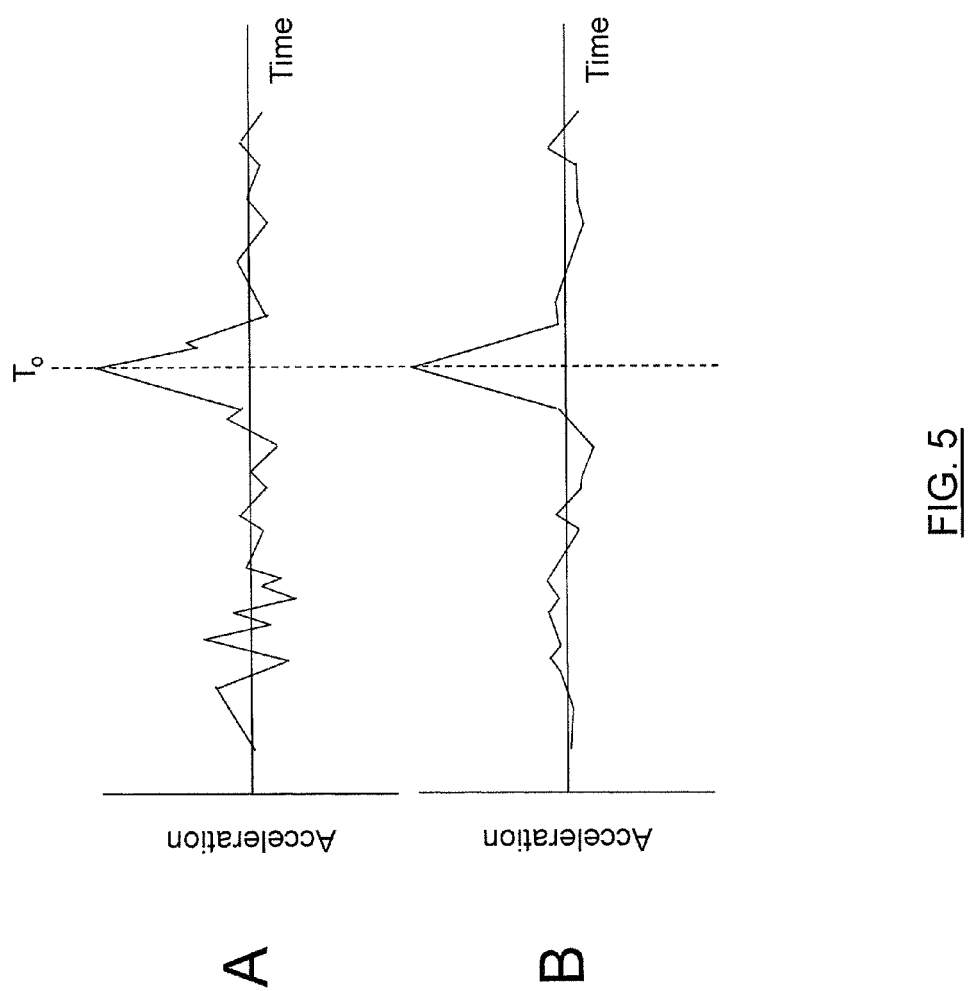
FIG. 5 is a plot of a signal as received from a sensor of device A and a signal as received from a sensor of device B for synchronization.

The bumping of devices together may establish a synchronization event between the devices which were bumped. In an example embodiment, an accelerometer, such as sensor 84, may sense the bump through a change in acceleration and establish a synchronization point or a reference time in response to receiving the bump. FIG. 5 illustrates an example embodiment of the signals received from the accelerometers of device "A" and device "B." As illustrated, the accelerometers for each device experience a bump at the same time, established as reference time $T_o$ as the synchronization point between device "A" and device "B." This synchronization point $T_o$ may then be the reference time used by the collaboration application to ensure that device "A" and device "B" are synchronized for the duration of the collaboration application. While some example embodiment disclosed herein recite examples using accelerometers, other sensors may be used, such as a gyroscopic sensor, a magnetic field sensor, or any type of sensor that may detect a positional change in a device. Additionally or alternatively, a microphone may be used to detect the sound of the two devices bumping against each other.

The reference time $T_o$ may be determined from the signal from the accelerometer through a number of methods including establishing the maximum value, a maximum derivative, and/or a threshold. In the maximum value method of establishing the reference time, the "bump" may be determined based upon the highest acceleration seen during the sampling period of the accelerometer. The highest acceleration may be measured from the absolute value of the acceleration experienced at the accelerometer to negate orientation or direction of the acceleration. In the maximum derivative method, the derivative of the wave forms of the accelerometer signal may be calculated to establish the maximum value of the derivative, which is determined to be the "bump" to synchronize the devices at reference time $T_o$. For the threshold method, a predefined threshold of acceleration value may be used such that an acceleration value exceeding the threshold is determined to be a "bump" for synchronization. The threshold value of acceleration would be experienced by both devices during a bump at the same time, thus establishing a reference time $T_o$.

Another method of establishing a reference time for synchronization may include a correlation method. In a correlation method, a first device may be bumped with a second device, where the first device is the primary device or the device that has initiated the collaborative application. In such an embodiment, the second device may send the accelerometer data from the second device to the first device, where the accelerometer data generated from the accelerometer signal may be acceleration measured against a time line that is generated by the clock of the second device. The first device may then compare the accelerometer data of the first device with the accelerometer data of the second device to establish an offset that is determined to be present between the clocks of the first device and the second device. The first device may then apply that offset to any time-stamped data or information that is received from, or transmitted to the second device, maintaining synchronization between the first device and the second device.

Figure 6:
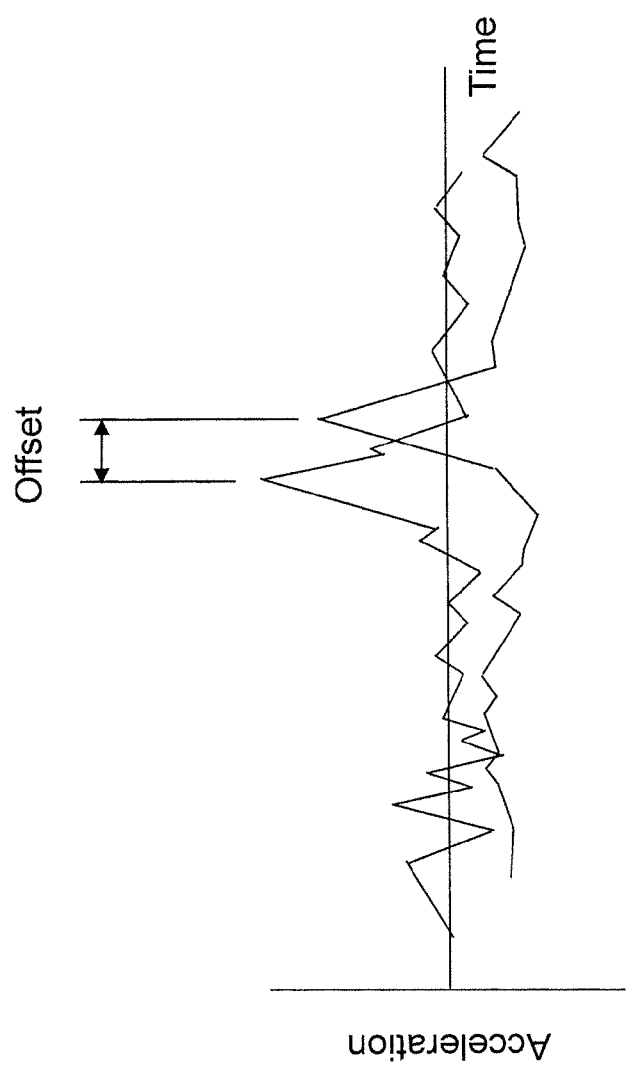
FIG. 6 is a plot of a signal as received from a sensor of device A and a signal as received from a sensor of device B for synchronization as using a correlation method.

FIG. 6 illustrates an example embodiment of the correlation method in which the acceleration data from two devices is shown on a timeline that may be the time-of-day as determined by each device (e.g., by processor 70). As the "bump" between the devices occurred simultaneously, the difference between the determined bump (e.g., through the maximum acceleration value method) is determined to be the offset between the time-of-day clocks of each of the devices. This offset may be used for transmitting and receiving data such that the devices are kept in synchronization during use of the collaboration application.

Additional devices may also be synchronized with devices that have already been synchronized together through any one of the aforementioned methods. For example, with reference to the example embodiment illustrated in FIG. 7, if a third device (e.g., device "C") is to join the collaboration application, it may be bumped with either device "A" or device "B." As both device "A" and device "B" are synchronized, the device with which device "C" is bumped can now be synchronized. For example, if device "C" is bumped with device "B", another reference time $T_1$ may be established. In an example embodiment, the offset between $T_1$ and $T_o$ may be communicated between device "B" and device "C" such that device "C" can recognize $T_o$ as the original synchronization point and devices "A," "B," and "C" can collaborate as synchronized devices. Optionally, without communication of an offset, device "A" may be synchronized with device "B" at reference time $T_o$ while device "B" may be synchronized with device "C" at reference time $T_1$, such that collaboration between device "A" and device "C" is established and maintained through device "B" which recognizes any offset between $T_o$ and $T_1$, thus maintaining synchronization between device "B" and device "C."

The sensors (e.g., sensor 84) used to establish synchronization between devices for a collaboration application may be configured to be sampled over a period of time in which a synchronizing bump is expected to occur. There are several methods to configure the timing and duration of the sampling phase such as by time interval, bump detection, and user-guided.

The time interval sampling period method may provide a limited-duration time window in which a bump is expected to occur. The time interval may be set by a user or predefined by a collaboration application. The time interval may be, for example, around two seconds and the time interval may begin upon the start of a collaboration application on a device. For example, a first device may initiate a collaboration application and join another device to the collaboration application through a request via near-field or far-field communication protocols (e.g., via communications interface 74). A user can also initiate the collaborative application on both devices. Upon receiving the request or accepting the request at the second device, the second device may begin a time interval in which a synchronization bump is expected to occur. The sensor for detecting the bump, such as an accelerometer, may be sampled during this time interval. If a bump is not recognized during the time interval, the collaboration application may proceed without synchronization if possible, otherwise the time interval may restart or a user may be prompted for a synchronizing bump.

The bump detection sampling period method may provide a sampling period that begins upon the initiation of a collaboration application and only ends after a bump is detected. The bump detection sampling period may be desirable for collaboration applications that require synchronization between participating devices to properly function. Optionally, the bump detection sampling period may begin in response to a user input indicating that a synchronizing bump is anticipated.

A user-guided sampling period for detecting a synchronizing bump may be initiated manually by a user, for example, by pressing an input to begin a synchronizing function. The user may be required to depress an input throughout the synchronization, or the synchronization may end when instructed by a user. Optionally, the user may instruct initiation of the sampling period and it may end upon detection of a bump or when the sampling period times-out after a predetermined amount of time.

Upon synchronizing multiple devices together for use of a collaboration application, the collaboration application may function more efficiently and accurately. For example, in an embodiment in which the collaboration application is a multi-media playback application, two collaborating devices may each play back one or more channels of a multiple-channel multimedia file, such as the right and left channels of a stereo audio file. Synchronizing the devices may prevent or reduce the likelihood of the left and right channels being out of phase.

In some example embodiments, synchronization of devices participating in a collaboration application may be performed before, during, or after the collaboration application session. For example, a collaboration application in which two devices are collaborating to capture audio and video data of a common event, the bump and the synchronization can be performed separately at any point before, during, or after the capturing of the audio and video data. In the embodiments described above, the bump and the synchronization may be performed at the initiation of the collaboration application such that the participating devices are synchronized during the data capture. However, if the captured data is intended for playback or other manipulation at a later time, the synchronization between participating devices may be performed at any point.

Figure 8:
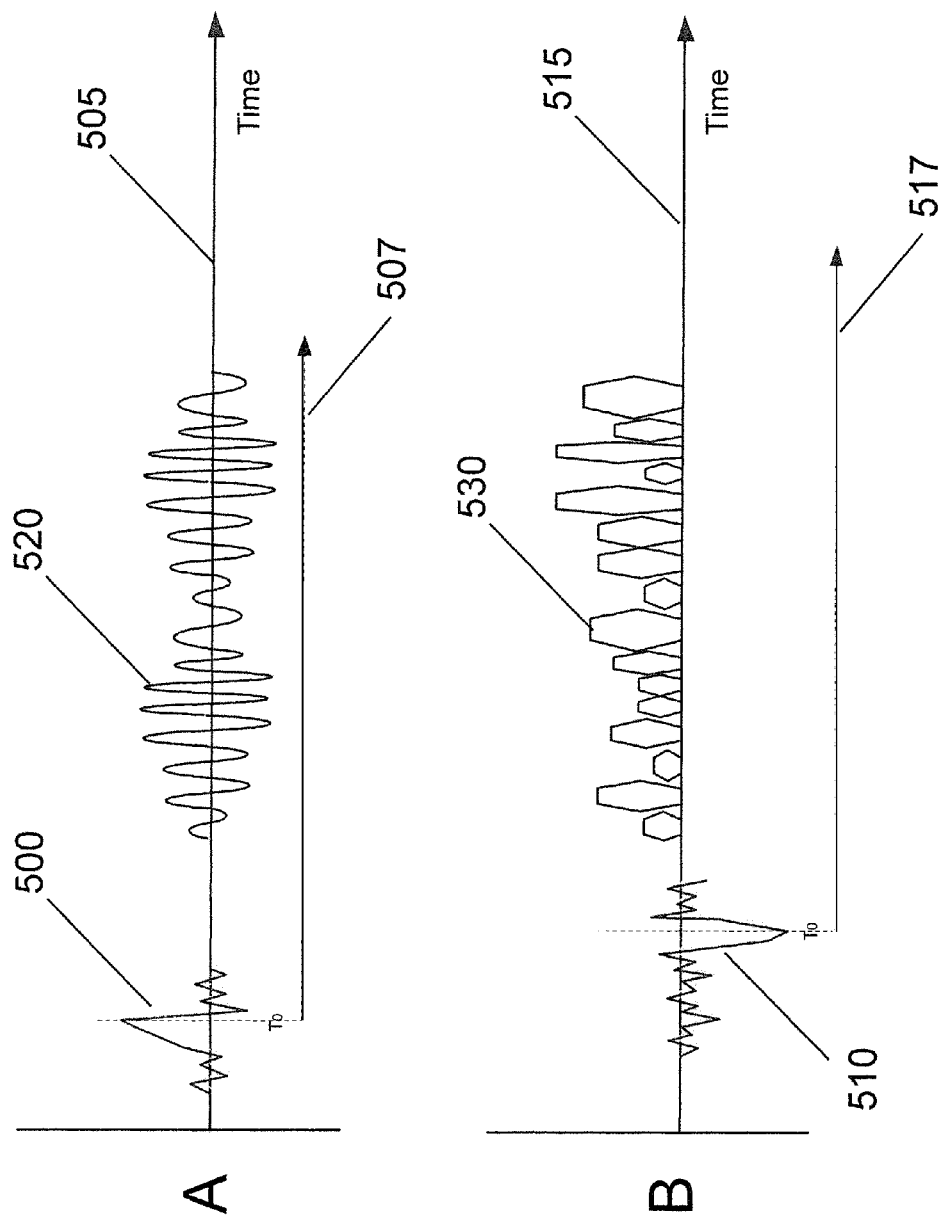
FIG. 8 illustrates a plot of a signal as received from a sensor of device A and a signal as received from a sensor of device B for synchronization.

FIG. 8 illustrates an example embodiment in which device A is capturing audio data 520 and device B is capturing video data 530, each along their respective internal clock time line 505 and 515. In the example embodiment, the accelerometer data is received by device A at 500 and by device B at 510. The detected bump establishes a reference time $T_o$, at which point the data captured by each respective device will be synchronized. The synchronization can occur before, during, or after the data capture as the point from which the devices will be synchronized has been established at $T_o$. Additionally, the reference time $T_o$ can be established during the data capture such that the collected data may be synchronized at any point after the establishment of the reference time. The synchronization between devices in such an embodiment may be performed at a network entity, such as at a server, or at one of the participating devices. Once synchronized, the data from each participating device is aligned at reference time $T_o$ such that the data is aligned along timelines 507 and 517 respectively.

Example embodiments of the present invention provide an improvement over existing time synchronization techniques by not requiring communication external of the device, such as wireless communication. Multiple devices may by synchronized for a collaboration application without communicating with a network entity, and in some embodiments, without communicating with each other regarding a reference time for synchronization. Thus, embodiments of the present invention may provide more accurate and repeatable synchronization of devices while reducing or eliminating network latency and network communication. Further, synchronization between devices may be accomplished while neither device has a reliable network connection. Embodiments of the present invention may be used in places where a wireless signal is not available or not permitted, such as on an airplane in flight.

Figure 9:
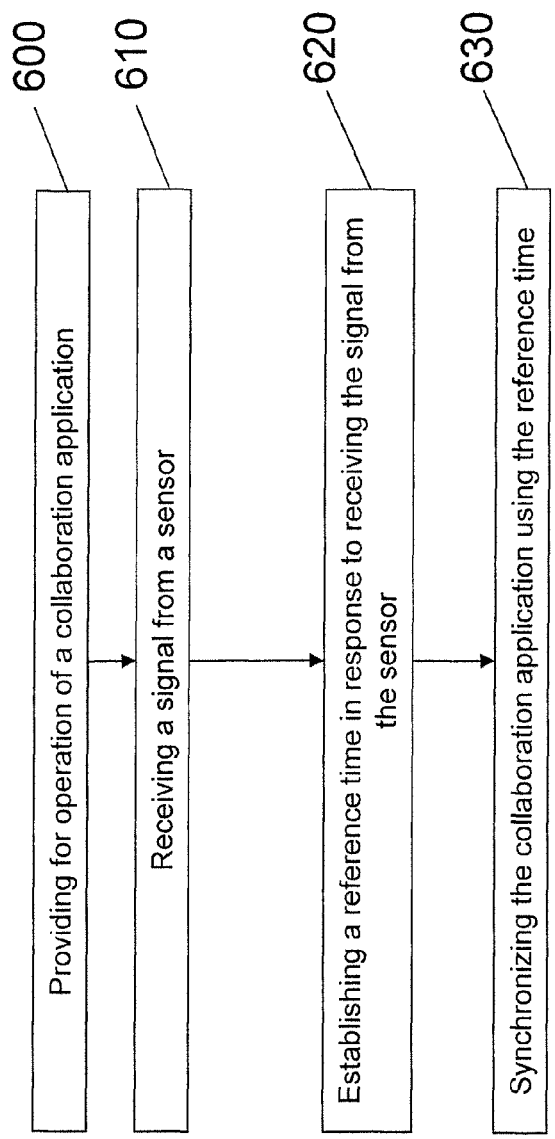
FIG. 9 is a flowchart of the operations performed to provide synchronization between devices for a collaboration application according to an example embodiment of the present invention.
Figure 10:
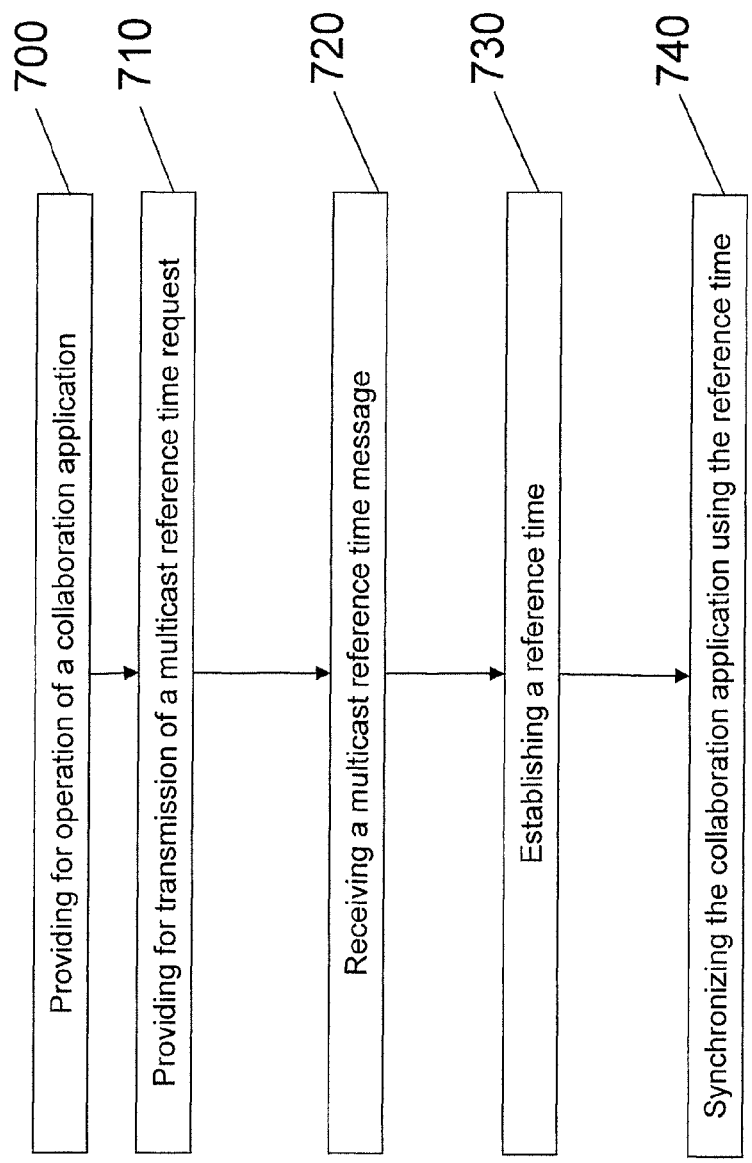
FIG. 10 is a flowchart of the operations performed to provide synchronization between devices for a collaboration application according to another example embodiment of the present invention.

FIGS. 9 and 10 are flowcharts of methods and program products according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user device and executed by a processor in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 9, may include providing for operation of a collaboration application at 600, receiving a signal from a sensor at 610, establishing a reference time in response to receiving the signal from the sensor at 620, and synchronizing the collaboration application using the reference time at 630.

A method according to another embodiment of the invention, as shown in FIG. 10, may include providing for operation of a collaboration application at 700, providing for transmission of a multicast reference time request at 710, receiving a multicast reference time message at 720, establishing a reference time therefrom at 730, and synchronizing the collaboration application using the reference time at 740.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. For example, with reference to FIG. 9, in some embodiments, the sensor may be an accelerometer and the signal may include a sampling of information from the sensor. The sampling may be conducted during a time interval, or possibly until a bump is detected. Establishing the reference time may include detecting a maximum value of the signal and/or detecting the signal exceeding a pre-defined threshold. In some embodiments, establishing the reference time may not require wireless communication.

Figure 7:
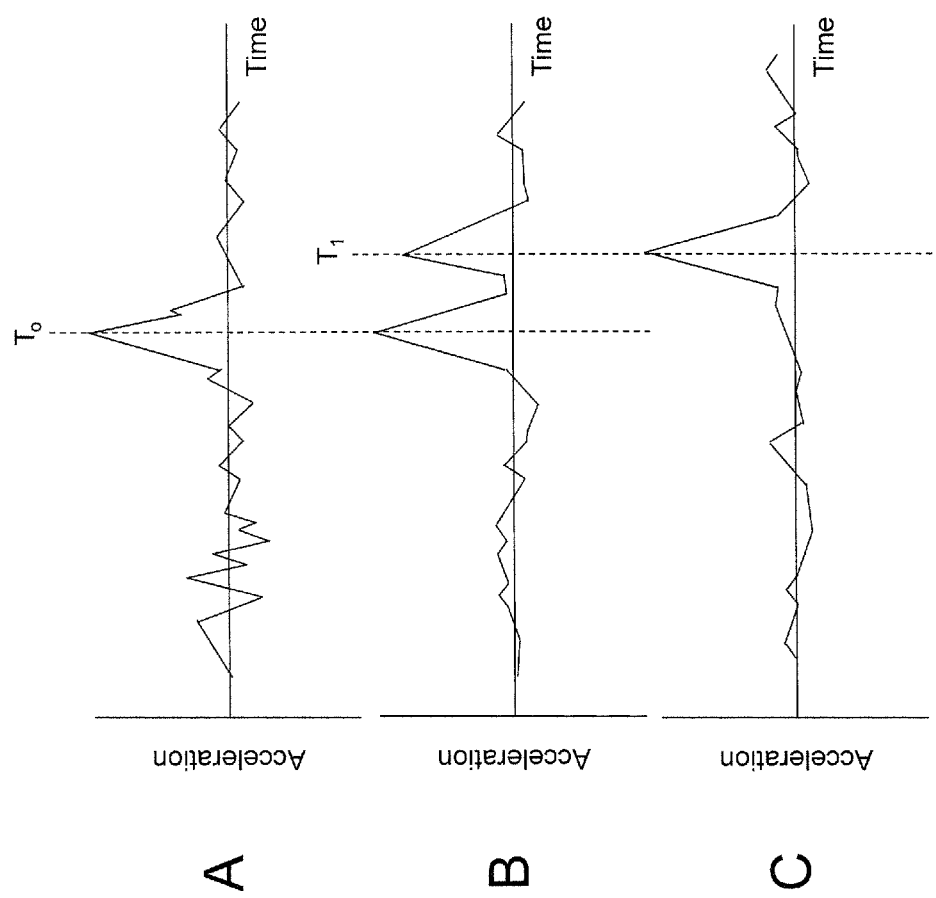
FIG. 7 is a plot of a signal as received from a sensor of device A, a signal as received from a sensor of device B, and a signal as received from a sensor of device C for synchronization.

In an example embodiment, an apparatus for performing the method of FIG. 7 above may comprise a processor (e.g., the processor 70) configured to perform some or each of the operations (600-630 and/or 700-740) described above. The processor 70 may, for example, be configured to perform the operations (600-630 and/or 700-740) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 600-630 and/or 700-740 may comprise, for example, the apparatus 50 (or respective different components thereof). Additionally or alternatively, at least by virtue of the fact that the processor 70 may be configured to control or even be embodied as apparatus 50, the processor 70 and/or a device or circuitry for executing instructions or executing an algorithm for processing information as described above may also form example means for performing operations 600-630 and/or 700-740.

An example of an apparatus according to an example embodiment may include at least one processor and at least one memory including computer program code. The at least one memory and the computer program code may be configured to, with the at least one processor, cause the apparatus to perform the operations 600-630 and/or 700-740 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 600-630 and/or 700-740 (with or without the modifications and amplifications described above in any combination).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
providing for operation of a collaboration application among at least two participating devices, wherein the collaboration application comprises at least one of: a game in which each participating device is a player, an application to distribute computational requirements among participating devices, or an application where each participating device gathers sensor data for compilation;
providing for transmission of a multicast reference time message request from one of the at least two participating devices to a wireless access point, wherein the multicast reference time message is requested for transmission to each of the at least two participating devices, wherein the at least two participating devices comprises an original requesting device, operating the collaboration application, and wherein the reference time message is unrelated to a clock time independently maintained on the at least two devices and is associated with the wireless access point;
receiving a multicast reference time message;
establishing a reference time in response to receiving the reference time message and receiving a confirmation at the original requesting device; and
synchronizing the collaboration application using the reference time.

2. The method of claim 1, wherein the synchronization of the collaboration application is performed in response to receiving an acknowledgement message from collaborating devices.

3. The method of claim 2, further comprising providing for transmission of a second multicast reference time request in response to not receiving an acknowledgement message from the collaborating devices.

4. The method of claim 3, wherein the multicast reference time message is received from the wireless access point.

5. The method of claim 1, wherein synchronization of the collaboration application does not require network latency compensation.

6. The method of claim 1, wherein all collaborating devices of the collaboration application are within range of the wireless access point.

7. The method of claim 1, wherein each collaborating device calculates a delay specific to itself to improve accuracy of the synchronization.

8. An apparatus comprising at least one processor and at least one memory including computer program code, the at least one memory and the computer program code configured to, with the processor, cause the apparatus to at least:
provide for operation of a collaboration application among at least two participating devices, wherein the collaboration application comprises at least one of: a game in which each participating device is a player, an application to distribute computational requirements among participating devices, or an application where each participating device gathers sensor data for compilation;
provide for transmission of a multicast reference time message request from one of the at least two participating devices to a wireless access point, wherein the multicast reference time message is requested for transmission to each of the at least two participating devices, wherein the at least two participating devices comprises an original requesting device, operating the collaboration application, and wherein the reference time message is unrelated to a clock time independently maintained on the at least two devices and is associated with the wireless access point;
receive a multicast reference time message and receiving a confirmation at the original requesting device;
establish a reference time in response to receiving the reference time message; and synchronize the collaboration application using the reference time.

9. The apparatus of claim 8, wherein the synchronization of the collaboration application is performed in response to receiving an acknowledgement message from collaborating devices.

10. The apparatus of claim 9, wherein the apparatus is further caused to provide for transmission of a second multicast reference time request in response to not receiving an acknowledgement message from the collaborating devices.

11. The apparatus of claim 10, wherein the multicast reference time message is received from the wireless access point.

12. The apparatus of claim 8, wherein synchronization of the collaboration application does not require network latency compensation.

13. The apparatus of claim 8, wherein all collaborating devices of the collaboration application are within range of the wireless access point.

14. The apparatus of claim 8, wherein each collaborating device calculates a delay specific to itself to improve accuracy of the synchronization.

15. A computer program product comprising at least one non-transitory computer-readable storage medium having computer-executable program code instructions stored therein, the computer-executable program code instructions comprising:
    program code instructions to provide for operation of a collaboration application among at least two participating devices, wherein the collaboration application comprises at least one of: a game in which each participating device is a player, an application to distribute computational requirements among participating devices, or an application where each participating device gathers sensor data for compilation;
    program code instructions to provide for transmission of a multicast reference time message request from one of the at least two participating devices to a wireless access point, wherein the multicast reference time message is requested for transmission to each of the at least two participating devices, wherein the at least two participating devices comprises an original requesting device, operating the collaboration application, and wherein the reference time message is unrelated to a clock time independently maintained on the at least two devices and is associated with the wireless access point;
    program code instructions to receive a multicast reference time message;
    program code instructions to establish a reference time in response to receiving the reference time message and receiving a confirmation at the original requesting device; and
    program code instructions to synchronize the collaboration application using the reference time.

16. The computer program product of claim 15, wherein the program code instructions to synchronize the collaboration application are executed in response to receiving an acknowledgement message from collaborating devices.

17. The computer program product of claim 16, further comprising program code instructions to provide for transmission of a second multicast reference time request in response to not receiving an acknowledgement message from the collaborating devices.

18. The computer program product of claim 17, wherein the multicast reference time message is received from the wireless access point.

19. The computer program product of claim 15, wherein the program code instructions to synchronize the collaboration application does not require network latency compensation.

20. The computer program product of claim 15, wherein all collaborating devices of the collaboration application are within range of the wireless access point.

* * * * *